July 19, 1949.  L. F. WALLIS  2,476,786

FORMATION OF RUBBER TREADS ON VEHICLE TIRES

Filed July 23, 1947

Inventor
L. F. Wallis
By Hancock Dowling Keeble
Attys.

UNITED STATES PATENT OFFICE 2,476,786

FORMATION OF RUBBER TREADS ON VEHICLE TIRES

Leonard Francis Wallis, Lower Hutt, Wellington, New Zealand

Application July 23, 1947, Serial No. 763,069
In New Zealand October 1, 1943

5 Claims. (Cl. 152—212)

The invention relates to the formation of treads on rubber tyres for wheeled vehicles, in connection with which it has been proposed to form treads on tyres by the application thereto, and uniting therewith by a vulcanising process, of strips of rubber, the latter in some cases being reinforced with fabric.

It is an object of the present invention, to provide an improved construction of tread of the type aforesaid, but wherein the construction of the tread is such that the wear resisting, non-skidding, and puncture resisting abilities of the tyre are considerably enhanced, as compared with tyres provided with known constructions of treads.

Briefly, the invention may be said to reside in a vehicle tyre provided with a tread formed by a plurality of composite strips comprising rubber and fabric reinforcement, said strips being compactly arranged side by side on the tyre, in contacting but separable relationship with each other, with the fabric presented edgeways on to the wearing surface of the tread, and being united at their inner surfaces with the tyre so as to be capable of flexing thereon independently of each other, to create air spaces between the strips.

In order that the invention may be better understood, it will be more particularly described with reference to the accompanying drawings wherein—

Figure 1:
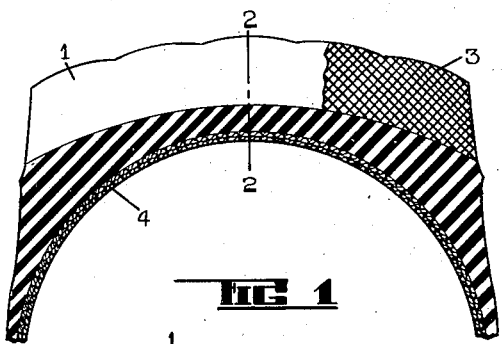
Figure 2:
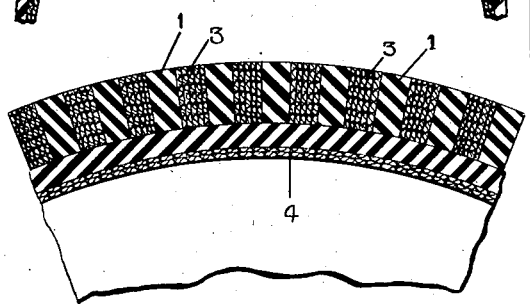
Figure 3:
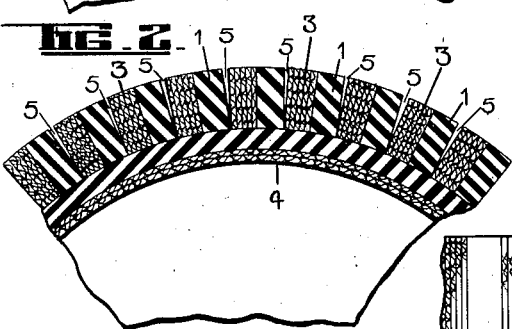
Figure 6:
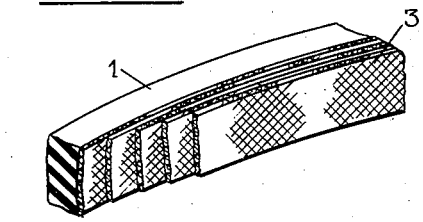
Figure 5:
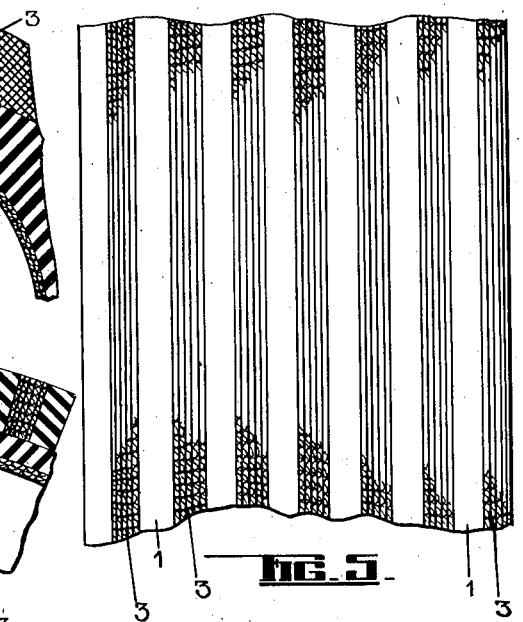
Figure 4:
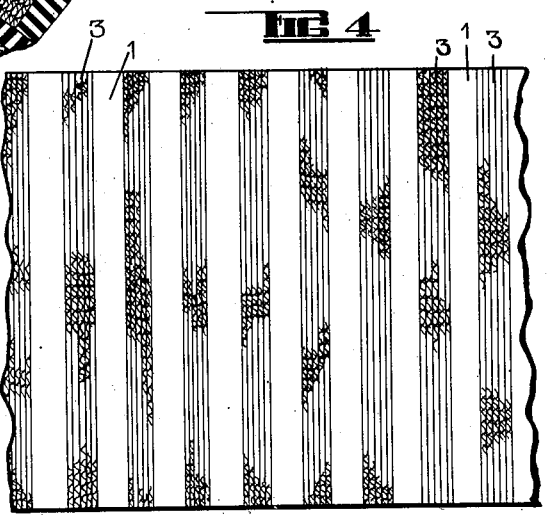

Fig. 1 is a part cross sectional view (broken) of a tyre having the improvements incorporated therein, and Fig. 2 is a sectional view taken on the line 2—2, Fig. 1, while Fig. 3 is a similar view to Fig. 2, but showing the tyre portion flexed slightly to show separation of the tread forming strips from each other, and Figs. 4 and 5 are views of portions of tread surfaces of tyres, showing in Fig. 4 the tread forming strips extending transversely of the tyre, and showing in Fig. 5 the tread forming strips extending circumferentially of the tyre, Fig. 6 being an illustration in perspective (broken) of one of the tread forming strips.

In carrying out the invention, rubber having incorporated therein rubberised fabric reinforcement, or formed in layers with said rubberised fabric reinforcement, is provided or formed into strips of a length sufficient to enable them to extend across from side to side of, or circumferentially around the outer surface of a tyre, to form a tread or running surface thereon.

These tread forming strips, portion of one of which is shown in Fig. 6, each consist of a thickness 1 of rubber, and a thickness 3 of rubberised fabric, preferably in a plurality of closely united minor thicknesses, with the fabric extending through the strips from the outer or wearing surfaces to the inner surfaces thereof, when said strips are placed on a tyre 4.

The fabric serves to reinforce the rubber in which it is embedded, and also the thickness 1 of rubber with which the thickness or thicknesses 3 of rubberised fabric is or are united.

The thicknesses 3 of rubberised fabric are united with each other, and with the thickness 1 of rubber, so that the threads of the fabric incline from edge to edge of the material.

The strips used in the formation of treads on tyres, are cut from material formed as aforesaid, and are placed on the tyre so that not only does the fabric reinforcement in each strip extend from the outer or wearing surface to the inner surface thereof, but the fabric threads extend obliquely or incline through the strip, and are not disposed radially of the tyre.

This oblique or inclined disposition of the fabric threads in the strips, allows said threads to be longer than if they were disposed radially of the tyre, and enables them to be more securely gripped by and in the rubber, and to more effectively reinforce the latter, in addition to increasing the puncture resisting abilities of the tread.

The thickness 1 of rubber with which the thicknesses 3 of rubberised fabric are united, is solid rubber, preferably non-reinforced, except for the reinforcement effected by the rubberised fabric aforesaid, united therewith.

A tyre tread formed of strips each consisting of a thickness 1 of rubber, and rubberised fabric as aforesaid, has a wearing or running surface consisting of thicknesses 1 of solid rubber, separated by or alternating with rubberised fabric, as indicated at 3, and the threads of which latter extend obliquely, or incline right through the tread from the wearing or running surface.

It is found in practice, that in a tread formed as described, the rubberized fabric indicated at 3, between the thicknesses 1 of solid rubber, wears faster than the latter, with the result that the rubber projects slightly beyond the rubberized fabric thicknesses 3 between them, and such slight projection of the thicknesses 1 of solid rubber, gives the wearing surface of the tread a ribbed effect, and has the effect of increasing the non-skidding property of the tread, by increasing the grip of the latter on the surface over which it travels.

The strips comprising rubber 1 reinforced with the rubberised fabric 3, can conveniently be cut from old or worn tyres, or any article composed of rubber reinforced as described, or the material from which the strips are cut may be specially formed for the purpose.

In order to obtain satisfactory strips from a worn tyre, the latter is cut or split around the centre of the tread, and buffed both inside and outside, to reduce the shoulders of the tyre to an even thickness of the tread.

Starting from the cut centre of the tread, each tyre half is cut to produce an unbroken parallel sided strip usually about one half inch to five eighths of an inch wide, although other widths can be used.

These one piece strips are then cut into lengths, suitable for placing on a tyre, and it is essential that only lengths having substantially the same thicknesses 1 of rubber incorporated therein be used on the same tyre, otherwise an unbalanced tyre will result.

A preferred thickness 1 of rubber, is a thickness equal to a total thickness 3 of rubberised fabric in each strip.

It is convenient, and also facilitates the orderly handling and selection of strips suitable for use in the formation of a tread on a tyre, to cut the long unbroken strip produced from a casing half, into shorter lengths, and then to cut the latter into lengths suitable for application to a tyre, all of these last mentioned lengths being arranged side by side on a board, and following the obtaining of a number of loaded boards, to select such loaded boards, the strips on which are suitable for use on the same tyre.

A further difficulty to be overcome in the forming of treads on tyres with used rubber reinforced as described, is that firstly, the rubber which has already been subjected to heat and pressure treatment is not as malleable or plastic as unused rubber, and secondly, the end grain or fabric reinforcement acts to prevent the permeation of heat through the strip, with the result that there may be an air gap between the outer faces of the strips and the matrix or mould, and this difficulty can be overcome by allowing increased time or temperatures, as compared with the standard known practice in retreading at the present time.

The extent of the air gap will of course depend upon the wide variety of circumstances.

Apart from the foregoing, the air bag pressure, the curing times, and the temperature are to a certain extent variable in accordance with the class of tyre being dealt with, and the type of mould and design of matrix being used. Normally, the air bag pressure will be 100 lbs. to 150 lbs., whilst at 58 lbs. steam pressure, that is to say 296° F. the average curing time for average tread material being calculated at 14 minutes for each 1/16 of an inch thickness of the strips being applied, it being appreciated of course, that the higher the temperature, the shorter the curing time.

The strips can be formed with curved upper and lower surfaces, or with a flat upper surface and a curved lower surface, the curves extending through the length of the strips, and if necessary or desirable, conforming to the cross sectional curve of the outer surface of the tread portion of the tyre to which the tread to be formed by the strips is to be applied.

Before being used in the formation of a tread, the strips can be roughened or treated so as to result in their having surfaces to which rubber cementitious material or solution will readily adhere or key.

A surface to which a tread is to be applied, can be treated with rubber cementitious material or solution, which is allowed to become tacky by partial drying, and a covering or cushion gum or the like is applied thereto, after which the strips of which the tread is to be formed are applied to said surface, and the whole subjected to pressure and heat treatment, so that the applied tread of strips becomes firmly and securely united with the surface on or to which the tread is formed or applied.

The rubber cementitious material or solution should be of a strong adhesive nature, as it will be obvious that the tread forming strips when of old or used rubber, will not be as readily bonded as the unused camelback material used in ordinary retreading practice.

In applying the tread to a rubber tyre 4 irrespective of whether the latter has been used or not, the surface to which the tread is to be applied, is roughened to ensure a good keying or gripping surface for the rubber cementitious material or solution, of which one or a plurality of coatings may be used, and allowed to attain a tacky condition by partial drying.

The strips treated with rubber cementitious material or solution on their inner surfaces only and allowed to attain a tacky condition, can be laid out on a suitable surface and pressed firmly together, or on a layer or thickness of cushion-gum, in a track formation of the required thickness, and of a width approximately equal to the width of the tread to be formed, said track formation presenting a mass of strips adhering to the cushion gum, which mass can be applied to the tyre 4 either in sections, or in a strip equal in length to the circumference of the tyres.

When cushion gum is used as just mentioned, it is essential that it be firmly forced or pressed on and into the bases of the strips in order to obtain a secure grip thereof, or to key securely therein.

The tyre with the applied tread of strips can, if necessary or desirable, then be trimmed and have finishing strips of rubber or the like applied thereto, before being subjected to the pressure and heat treatment or treatments in a suitable mould or moulds, to produce the tyre with a tread thereon.

If desired, a layer or thickness of cushion gum can be applied to the surface of tyre after same has been treated with the rubber cementitious material or solution, the backing of the cushion gum being removed during its application to the tyre, the track composed of the strips being then applied to the cushion gum, and the whole subjected to pressure and heat treatment or treatments.

It is preferred to utilise strips in short lengths or sections, placed side by side, so that ample opportunity is provided for the escape between the strips during the uniting of the latter with each other and the tyre, by the heat and pressure treatment, of air likely to be otherwise imprisoned between the strips and the tyre, thereby avoiding the presence of air pockets behind the tread, and ensuring the uniform and even securing or uniting of the tread all round to, and with the tyre.

A further advantage arising out of the strip formation of tread, is that the joints between the strips permit heat used in uniting the strips at their inner surfaces with the tyre surface to penetrate to the bonding or securing medium employed between the strips and the tyre surface, and so ensure the former being securely united with the latter.

It is an important feature of the invention that the strips which form the tread be of composite form as described, and that while they are normally compactly arranged in contacting relationship with each other, they are separable only from each other under flexing of the tyre, to which they are united only at their bases or inner surfaces, so as to provide for the creation of air spaces 5 between the strips when the tyre is flexed.

Tyres having treads formed thereon as herein described, have incorporated therein provision for a hinging effect between the strips forming the tread and the tyre 4, each individual strip being vulcanised to the tyre 4 only at its base or inner surface, and therefore being enabled to flex on the tyre.

This hinging effect is equally advantageous whether the strips forming the tread are placed transversely on the tyre 4 or circumferentially thereon.

One of the advantages in a tyre having a tread formed thereon as described, and attributable to the hinging of the strips of which the tread is formed as aforesaid, is the very substantial improvement in the braking effect obtained, owing to the increased grip of the road obtained by the tyre 4, while the latter, owing to the creation of the air spaces 5 under the flexing of the tyre 4 remains very much cooler than where said spaces 5 are not provided, and further, owing to the hinging of the strips to the tyre 4, the ability of the latter to absorb stresses and torsion effects developed in actual running, as for instance when cornering, is increased, due to added flexibility afforded the tyre by the hinged strip construction.

The cooling effect provided for in this construction of tyre is particularly important for, as is well known, rubber deteriorates under excessive heat.

What I do claim and desire to obtain by Letters Patent of the United States of America is:

1. A vehicle tyre provided with a tread formed by a plurality of composite strips comprising rubber and fabric reinforcement, said strips being compactly arranged side by side on the tyre, in contacting but separable relationship with each other, with the fabric presented edgeways on to the wearing surface of the tread, and being united at their inner surfaces with the tyre so as to be capable of flexing thereon, independently of each other, to create air spaces between the strips.

2. A vehicle tyre provided with a tread formed by a plurality of composite strips, each of which consists of a thickness of rubber united with a thickness constituted by rubberised fabric, said composite strips being compactly arranged side by side on the tyre in contacting but separable relationship with each other, with the fabric presented edgeways on to the wearing surface of the tread, and being united at their inner surfaces with the tyre, so as to be capable of flexing thereon independently of each other, to create air spaces between the strips.

3. A vehicle tyre provided with a tread formed by a plurality of composite strips each of which consists of a thickness of rubber united with a thickness constituted by a plurality of minor thicknesses of rubberised fabric united with each other, said composite strips being compactly arranged side by side on the tyre, in contacting but separable relationship with each other, with the fabric presented edgeways on to the wearing surface of the tread, and being united at their inner surfaces with the tyre so as to be capable of flexing thereon independently of each other, to create air spaces between the strips.

4. A vehicle tyre provided with a tread formed by a plurality of composite strips, each of which consists of a thickness of rubber united with a thickness constituted by a plurality of minor thicknesses of rubberised fabric united with each other, said strips being compactly arranged side by side on the tyre in contacting but separable relationship with each other, and with the fabric presented edgeways on to the wearing surface of the tread, and so that the thicknesses of rubber, and the thicknesses of rubberised fabric, alternate on the tyre to form the wearing surface of the tread, said strips being united at their inner surfaces with the tyre so as to be capable of flexing thereon, independently of each other, to create air spaces between the strips.

5. A tyre the tread portion of which comprises separately formed composite strips of permanently united rubber and rubberised fabric, compactly arranged side by side on the tyre in contacting but separable relationship with each other, with the rubberised fabric presented edgeways on to the wearing surface of the tread, and permanently supported at one side by the rubber of the strip of which it forms part, said strips being united at their inner surfaces with the tyre so as to be capable of flexing thereon, independently of each other and so as to create air spaces only between the opposite unsupported sides of rubberised fabric of the strips and the rubber portions of adjacent strips.

LEONARD FRANCIS WALLIS.

REFERENCES CITED

The following references are of record in the file of this patent:

UNITED STATES PATENTS

| Number | Name | Date |
| --- | --- | --- |
| 1,182,634 | Buckley | May 9, 1916 |
| 2,239,070 | Work et al. | Apr. 22, 1941 |